United States Patent
Kern et al.

(10) Patent No.: US 6,913,305 B1
(45) Date of Patent: Jul. 5, 2005

(54) TAILGATE RAMP SYSTEM

(76) Inventors: Bill Kern, 4920 Pebble La., Wamego, KS (US) 66547-1438; Galen R. Harper, 9745 N. Taos Rd., Healy, KS (US) 67850-6002

( * ) Notice: Subject to any disclaimer, the term of this patent is extended or adjusted under 35 U.S.C. 154(b) by 0 days.

(21) Appl. No.: 10/684,862

(22) Filed: Oct. 14, 2003

Related U.S. Application Data

(63) Continuation-in-part of application No. 10/369,252, filed on Feb. 18, 2003, now Pat. No. 6,834,903.

(51) Int. Cl.[7] .......................................... B62D 33/023
(52) U.S. Cl. ............................ 296/51; 296/61; 296/62
(58) Field of Search ........................... 296/51, 61, 57.1, 296/62; 14/71.1; 414/537

(56) References Cited

U.S. PATENT DOCUMENTS

| | | |
|---|---|---|
| 3,756,440 A | 9/1973 | Raep, et al. |
| 3,972,428 A | 8/1976 | Love, Jr. et al. |
| 4,750,777 A | 6/1988 | Brammer |
| 5,133,584 A | 7/1992 | McCleary |
| 5,211,437 A * | 5/1993 | Gerulf .......................... 296/61 |
| 5,536,058 A | 7/1996 | Otis |
| 5,597,195 A | 1/1997 | Meek |
| 5,791,717 A | 8/1998 | Reich et al. |
| 5,816,638 A | 10/1998 | Pool, III |
| 5,988,725 A | 11/1999 | Cole |
| 6,082,801 A * | 7/2000 | Owen et al. ............... 296/57.1 |
| 6,742,826 B2 * | 6/2004 | Humphrey et al. ........... 296/51 |
| 6,834,903 B2 * | 12/2004 | Harper et al. ................. 296/51 |

\* cited by examiner

*Primary Examiner*—Jason Morrow
(74) *Attorney, Agent, or Firm*—Dale J. Ream

(57) ABSTRACT

A tailgate ramp system for providing convenient pickup bed access and safe vehicle loading/unloading includes a main frame with side members and a base member. A pair of ramp units are rotatably coupled to respective side members and are independently operable for convenient truck bed access. Each ramp unit includes a plurality of selectively extendable ramp sections. The ramp units are pivotally coupled to the frame side members for movement between vertical and horizontal configurations. Accordingly, the ramp units operate as tailgate components at the vertical configuration and as ramps at the horizontal configuration. An extension bar mounted on the base member enables slidable positioning of the ramp units at the horizontal configuration.

19 Claims, 18 Drawing Sheets

TAILGATE RAMP SYSTEM

REFERENCE TO RELATED APPLICATIONS

This application is a continuation-in-part of application Ser. No. 10/369,252, filed Feb. 18, 2003, now U.S. Pat. No. 6,834,903.

BACKGROUND OF THE INVENTION

This invention relates generally to vehicle tailgates and, more particularly, to a tailgate ramp system for providing convenient access to a pickup bed and safe loading/unloading of all-terrain or similar vehicles.

Loading ramps for vehicles have been in use for years. A conventional loading ramp includes an elongate rigid structure that extends or is extensible between the vehicle and a ground surface at an angle for loading an ATV, lawnmower, or the like.

Various devices have been proposed in the art for loading wheeled vehicles, such as ATV's, into the bed of a pickup. Examples of patented proposals include U.S. Pat. No. 5,312,149 to Boone; U.S. Pat. No. 5,536,058 to Otis; U.S. Pat. No. 5,244,335 to Johns; U.S. Pat. No. 4,750,777 to Brammer; U.S. Pat. No. 5,540,474 to Holland; U.S. Pat. No. 5,685,594 to Harper; U.S. Pat. No. 5,803,523 to Clark et al.; U.S. Pat. No. 2,806,735 to Smith; U.S. Pat. No. 399,468 to Lund et al.; U.S. Pat. No. 5,816,638 to Pool, III; U.S. Pat. No. 5,211,437 to Gerulf; and U.S. Pat. No. 5,988,725 to Cole.

Although assumably effective for their intended purposes, the existing devices occupy a significant amount of storage space within the pickup bed or, perhaps, are too long for the bed and must be propped up on the pickup's tailgate. Another problem with existing devices is that the ramps or other cargo are not easily accessible when the conventional pickup tailgate is in a closed configuration. A still further problem is that conventional ramps are unstable and may fall or become misaligned while loading/unloading an ATV.

Therefore, it is desirable to have a tailgate ramp system that incorporates a pair of ramp units in a split tailgate configuration so as to allow convenient pickup bed access when the ramp units are not being used for loading or unloading. Further, it is desirable to have a tailgate ramp system that provides quick and eassy conversion of the tailgate sections into extendable ramp sections when loading/unloading of an ATV is desired.

SUMMARY OF THE INVENTION

A tailgate ramp system according to the present invention includes a pair of ramp units mounted within a frame installed upon a pickup truck bed. The ramp units act as tailgate sections and are independently mounted to the frame and operable for easy access to cargo stored in the truck bed. The ramp units are rotatably mounted to the main frame for swingable movement within a horizontal plane between open and closed tailgate configurations. Each ramp unit is also pivotally mounted to the frame for independent movement between vertical and horizontal configurations. This movement moves the ramp units between a tailgate-use configuration and a ramp-use configuration. Each ramp unit includes a plurality of ramp sections that are outwardly extendable so as to form an elongate ramp. The ramp sections are coupled to the frame so as not to fall down during use. The ramp sections include cross-members and a grate so as to support the wheels of a vehicle during loading/unloading thereof.

Therefore, a general object of this invention is to provide a tailgate ramp system that is safe and convenient for loading/unloading all-terrain vehicles.

Another object of this invention is to provide a tailgate ramp system, as aforesaid, that operates as a tailgate and as loading ramps.

Still another object of this invention is to provide a tailgate ramp system, as aforesaid, that provides easy access to the interior of a pickup box without having to lower or lift a tailgate.

Other objects and advantages of this invention will become apparent from the following description taken in connection with the accompanying drawings, wherein is set forth by way of illustration and example, embodiments of this invention.

DESCRIPTION OF THE PREFERRED EMBODIMENT

Figure 1:
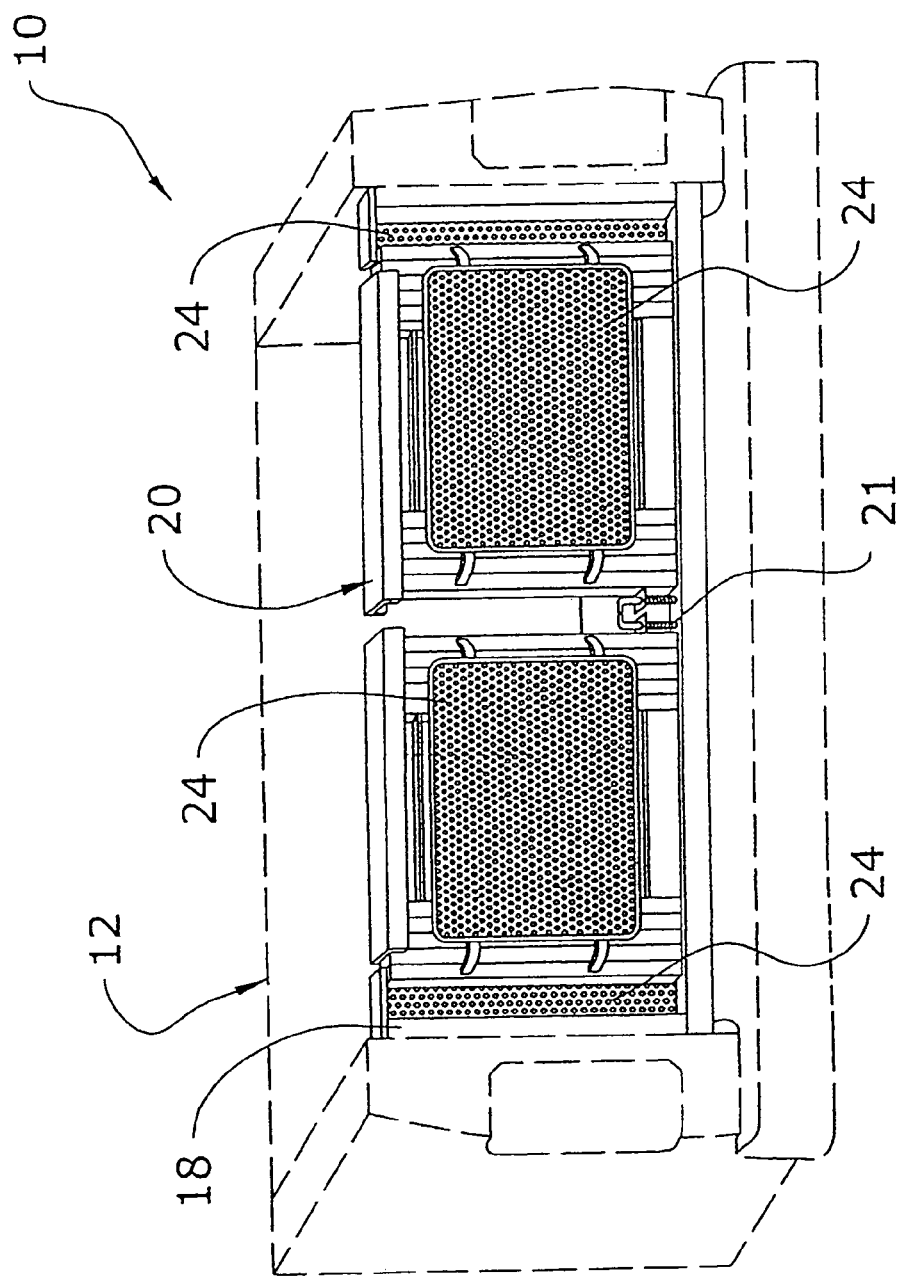
FIG. 1 is an upper perspective view of a tailgate ramp system attached to a pickup box in the closed position according to one embodiment of the invention.

Turning now descriptively to the drawings, in which similar reference characters denote similar elements throughout the several views, FIGS. 1 through 10 illustrate a tailgate ramp system 10 according to one embodiment of the invention, which comprises a pair of telescoping structures pivotally attached to a pickup box 12, wherein each telescoping structure is comprised of a frame structure 20 and a plurality of telescoping sections slidably positioned within the frame structure 20. The telescoping sections have cross members for supporting the wheels of a vehicle during loading/unloading thereof. It should be appreciated that the tailgate ramp system 10 described herein and various embodiments thereof may also be attached to and utilized with a trailer or other vehicles typically.

FIGS. 1 through 7 illustrate the main frame 18 of the present invention. The main frame 18 of the present invention has a U-shaped configuration that is pivotally retained within the rear of a pickup box 12 similar to a conventional tailgate with the lower pivot shafts received within receivers within the pickup box 12. The main frame 18 further includes a pair of latching mechanisms on both sides of the main frame 18 for selectively retaining the main frame 18 within a closed position upon the pickup box 12. The main frame 18 preferably has a hollow central portion for receiving the telescoping structures.

Figure 2:
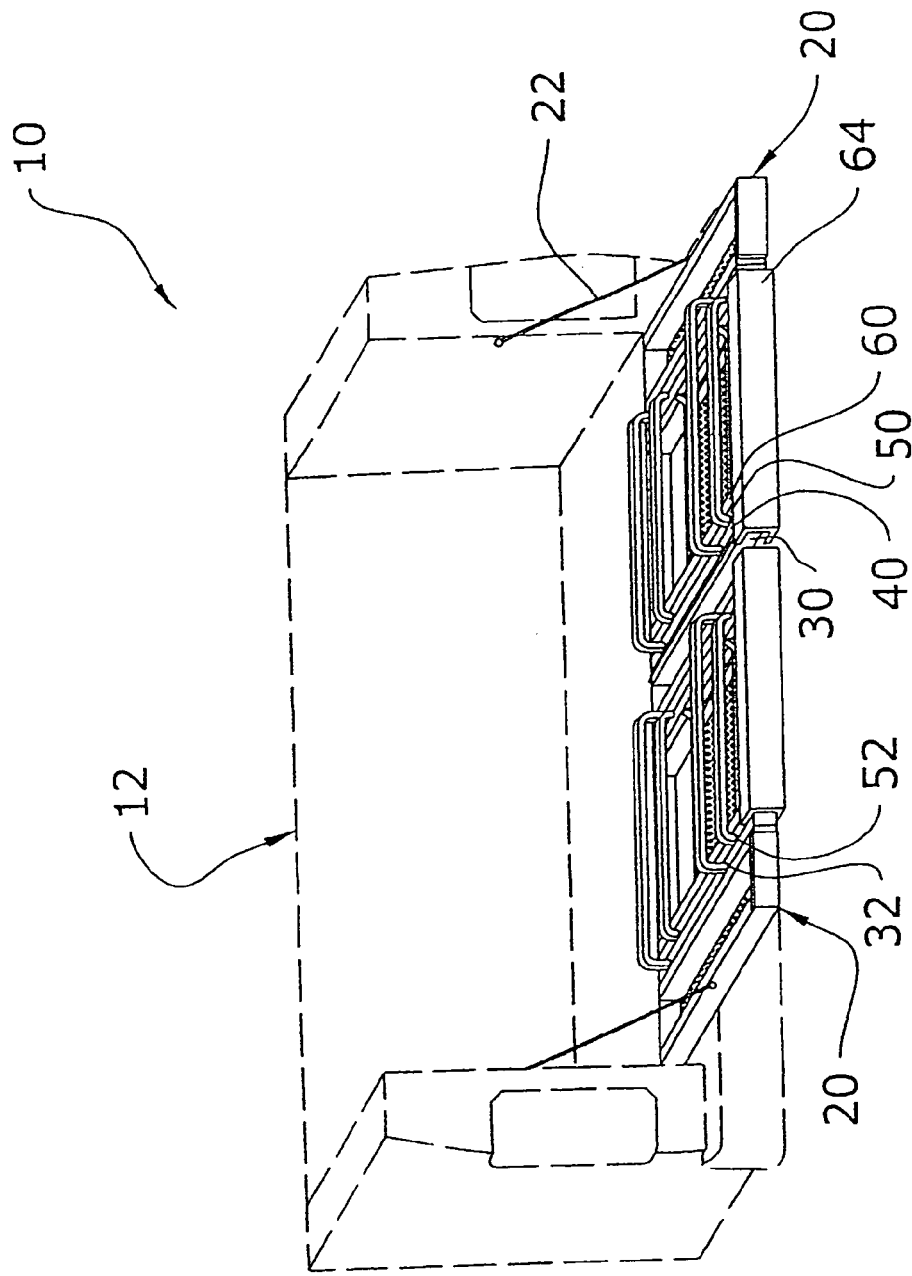
FIG. 2 is an upper perspective view of the tailgate ramp system as in FIG. 1 in the initial extended position.
Figure 8:
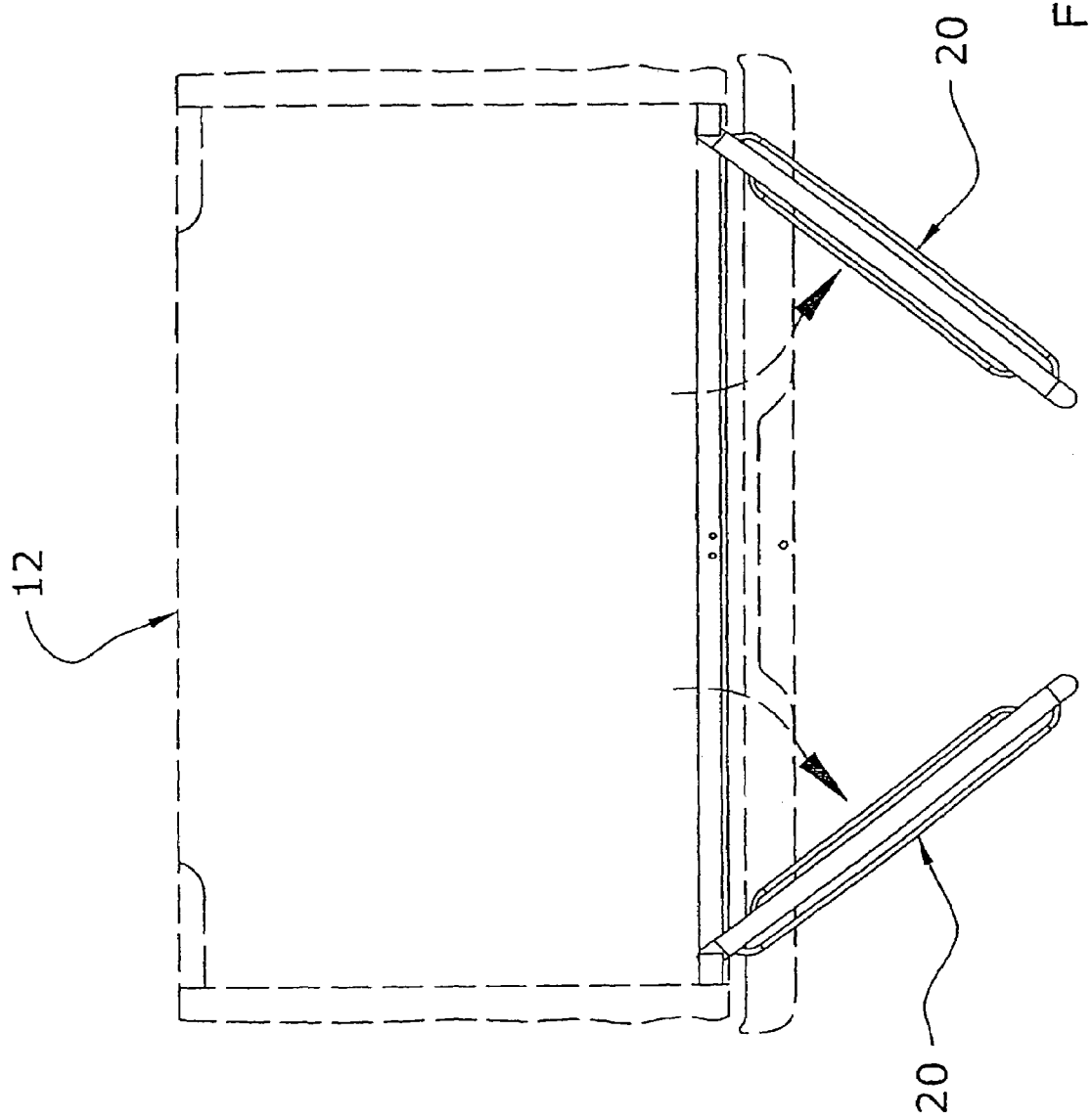
FIG. 8 is a top view of the tailgate ramp system showing the swinging of the ramp units along a horizontal plane.

FIGS. 1 and 2 of the drawings illustrate the pair of telescoping structures that are rotatably and pivotally attached within the main frame 18. The telescoping structures preferably are rotatably attached to the main frame 18 to rotate within a horizontal plane as shown in FIG. 8 of the drawings. The telescoping structures are also rotatably positioned within the main frame 18 to rotate along a vertical plane as shown in FIGS. 2 through 6 of the drawings.

The telescoping structures each have a frame structure 20 that has a pair of opposing frame channels 26 as shown in FIGS. 1 through 7 of the drawings. One or more grate members 24 are positioned within the frame structure 20 as best illustrated in FIGS. 3 through 6 of the drawings. Various other structures may be utilized instead of the grate members 24 such as bar members and the like.

Figure 6:
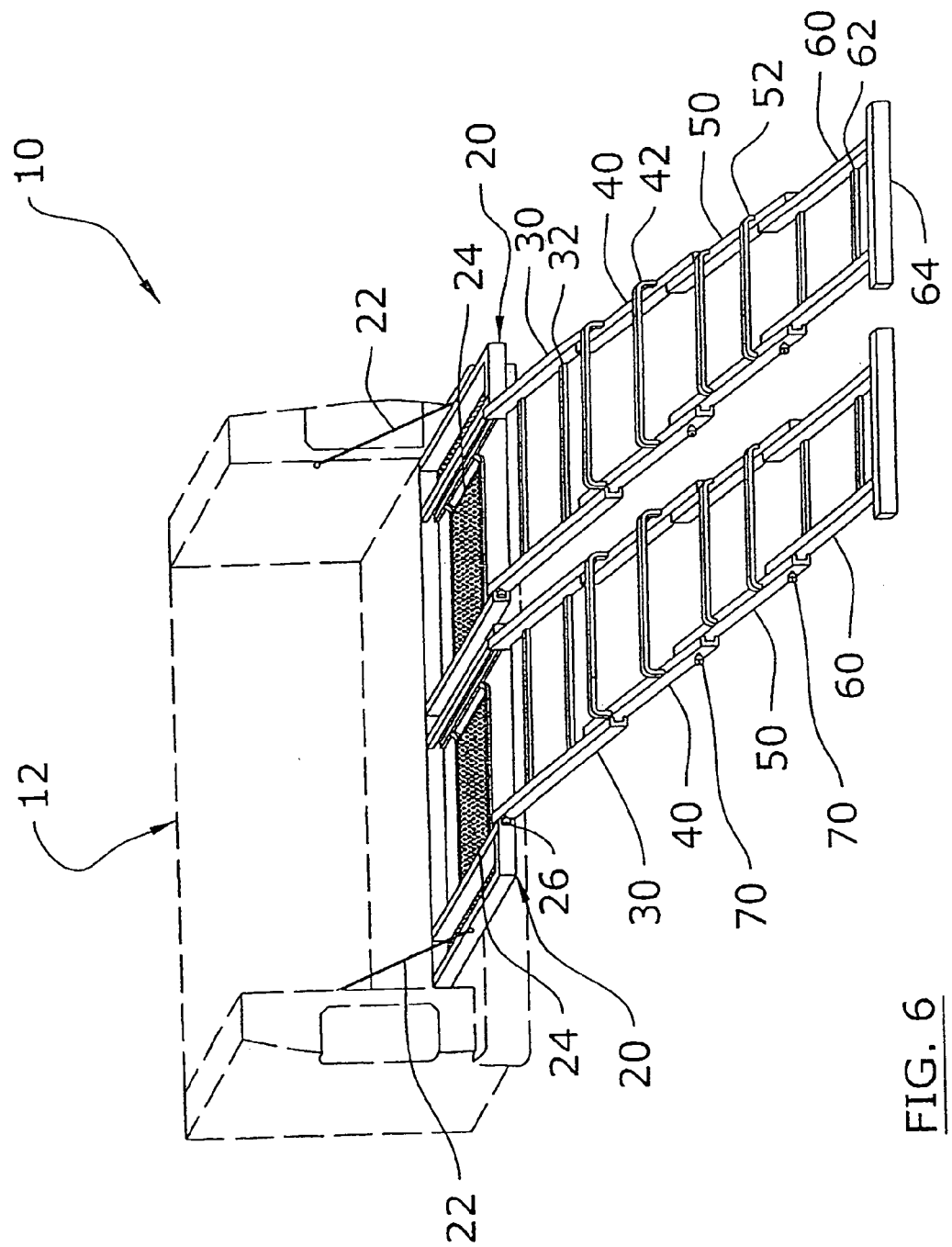
FIG. 6 is an upper perspective view of the tailgate ramp system as in FIG. 1 with the ramp sections fully removed and extended from the frame structure.

A plurality of sections 30, 40, 50, 60 are telescopically supported within the frame structure 20. The sections 30, 40, 50, 60 each have a plurality of roller members 70 extending from the sides thereof and a corresponding plurality of cross members 32, 42, 52, 62 for supporting the wheels of the vehicle during loading/unloading as shown in FIG. 6 of the drawings. The cross members 32, 42, 52, 62 preferably have a U-shaped structure which may also be inverted as shown in FIGS. 1 through 6 of the drawings.

Figure 9:
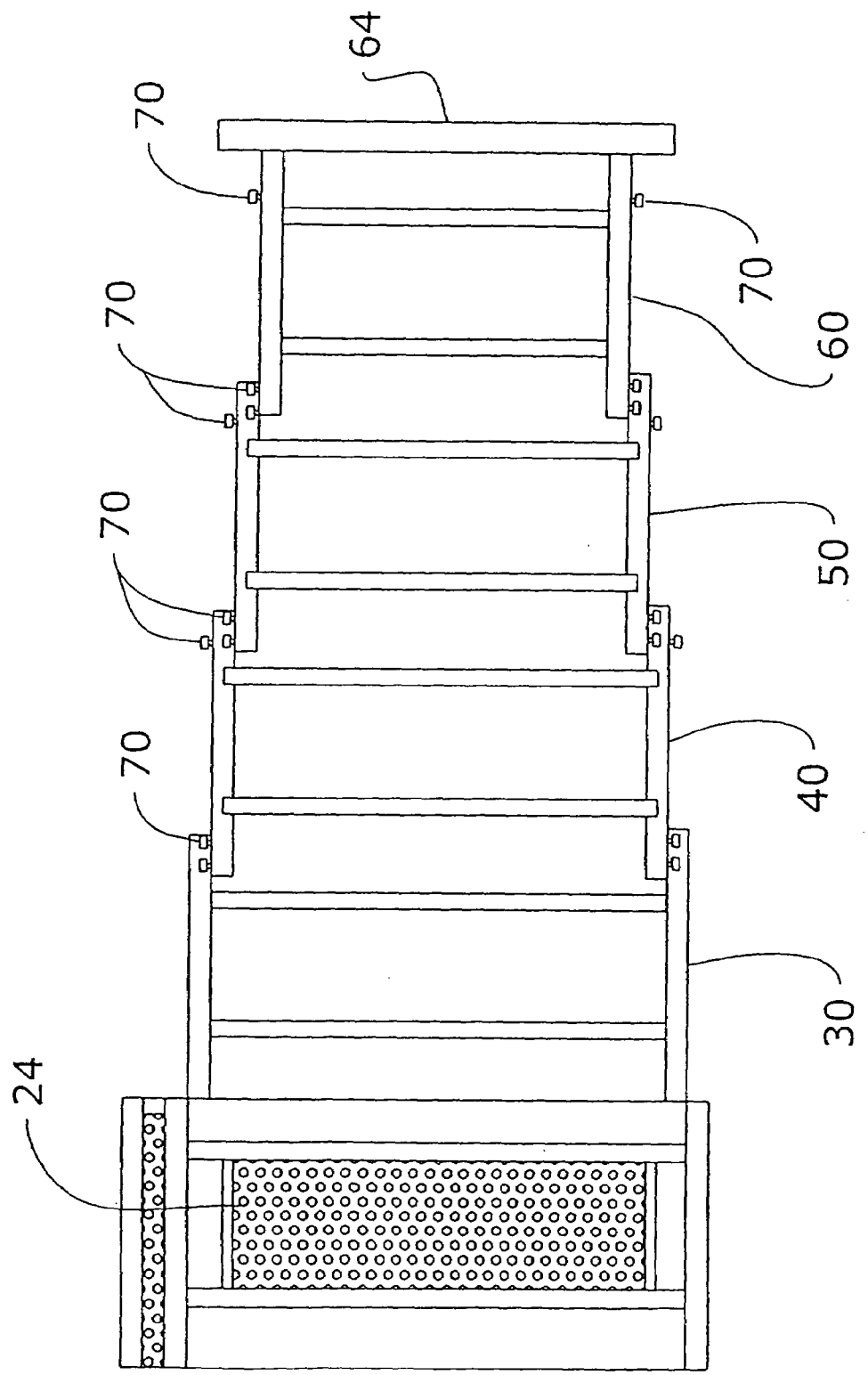
FIG. 9 is a top view of a ramp unit in the fully extended position.

There can be various numbers of sections 30, 40, 50, 60 as desired. Each of the sections 30, 40, 50, 60 is slidably retained within the other. The sections 30, 40, 50, 60 each have interior channels that receive the roller members 70 from the section as best illustrated in FIGS. 6 and 9 of the drawings. The cross members 32, 42, 52, 62 are sized to allow for the contraction of the plurality of sections 30, 40, 50, 60 without interference. The end of the sections 30, 40, 50, 60 preferably receives an end member for engaging the ground surface or other structure to load from or to.

Figure 3:
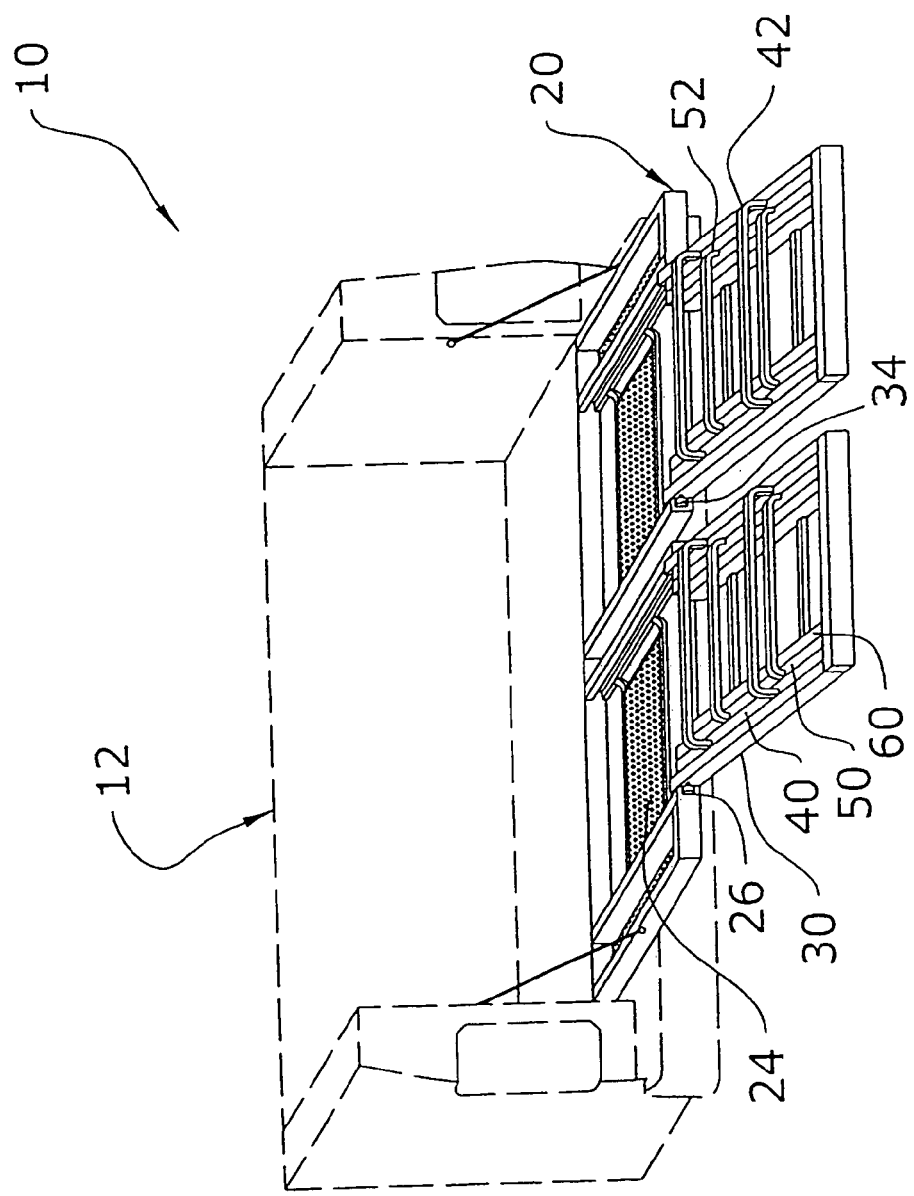
FIG. 3 is an upper perspective view of the tailgate ramp system as in FIG. 1 with the ramp sections partially extended from the frame structure.
Figure 4:
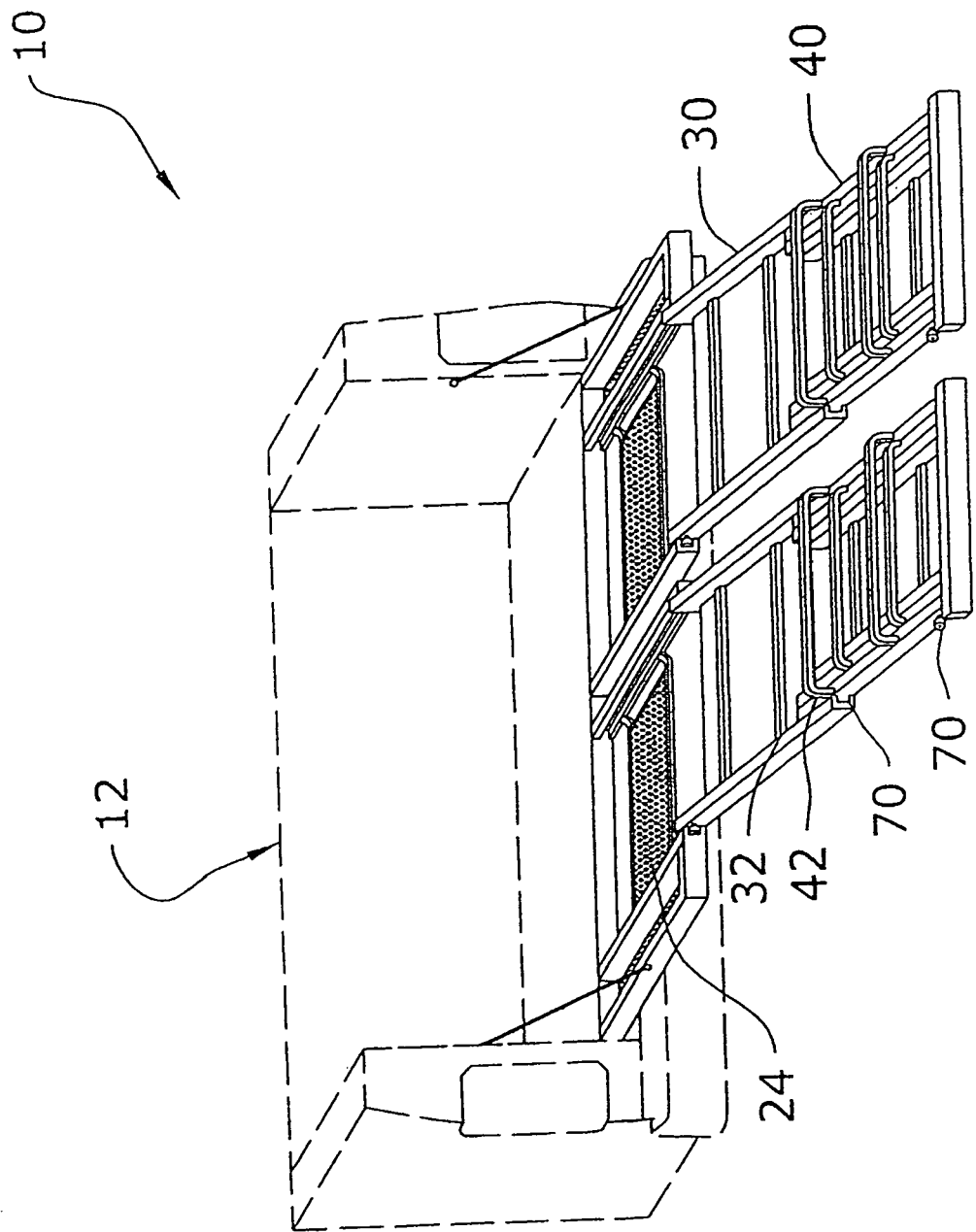
FIG. 4 is an upper perspective view of the tailgate ramp system as in FIG. 1 with the ramp sections further extended from the frame structure.
Figure 5:
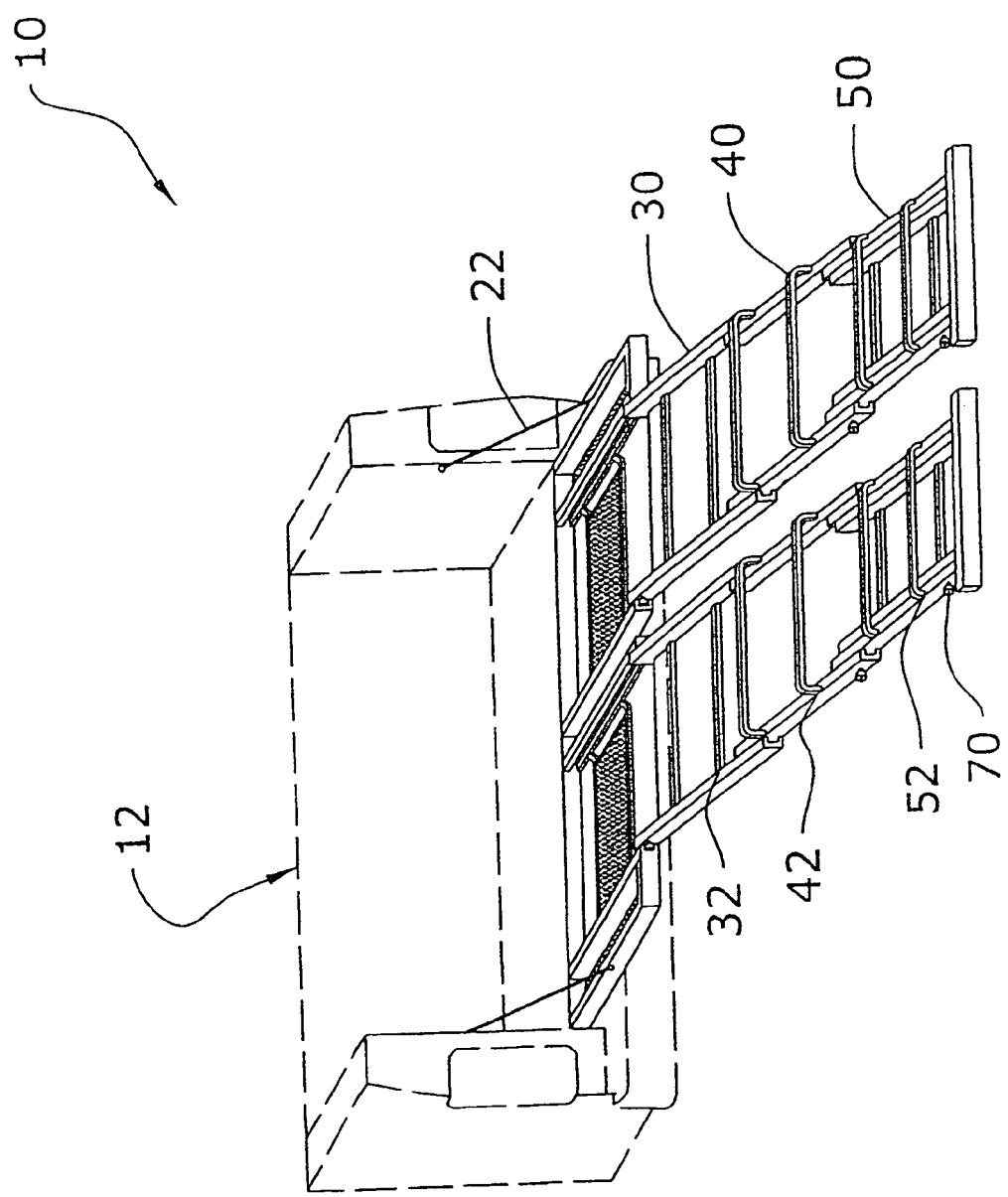
FIG. 5 is an upper perspective view of the tailgate ramp system as in FIG. 1 with the ramp sections further extended from the frame structure.

As shown in FIG. 9 of the drawings, the first section 30 has a single set of roller members 70 that are retained within the frame channels 26. The roller members 70 are retained within the frame channels 26 by a stopper member or similar stopping device within the frame channels 26. The first section 30 is able to pivot along with sliding with respect to the frame structure as shown in FIGS. 2 and 3 of the drawings.

Figure 10:
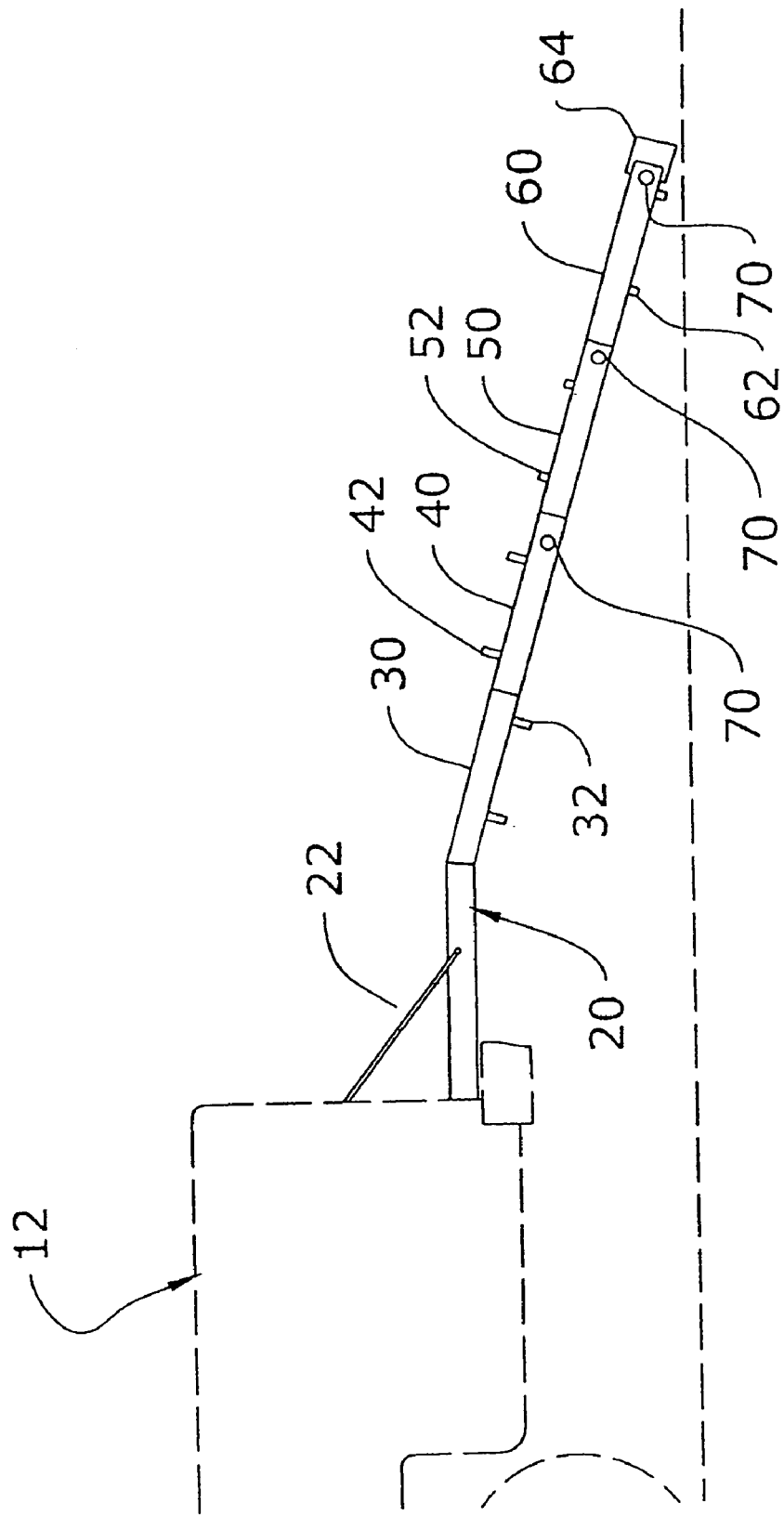
FIG. 10 is a side view of a ramp unit fully extended from a vehicle.

The first section 30 has a larger width than the second section 30 as best illustrated in FIG. 9 of the drawings. The first section 30 defines channels within that receive roller members 70 extending from the second section 40. The second section 40 preferably has two sets of roller members within a distal end thereof for retaining a relatively parallel structure with respect to the first section 30 as shown in FIGS. 9 and 10 of the drawings. The second section 40 further preferably includes another set of roller members 70 at the opposing end thereof for guiding the second section within the channels of the first section 30.

The second section 40 has a larger width than the third section 50 as best illustrated in FIG. 9 of the drawings. The second section 40 defines channels within that receive roller members 70 extending from the third section 50. The third section 50 preferably has two sets of roller members within a distal end thereof for retaining a relatively parallel structure with respect to the second section 40 as shown in FIGS. 9 and 10 of the drawings. The fourth section 60 further preferably includes the end member 64 attached thereto.

A securing structure 21 is attached to the frame structures 20 for allowing securing of the frame structures 20 within the main frame 18 as shown in FIG. 1 of the drawings thereby preventing rotation of the frame structures 20. The securing structure 21 is preferably comprised of a shaft member with a spring attached that is received within an aperture of the main frame 18 as shown in FIG. 1 of the drawings. Upper retaining structures prevent the frame structures 20 from pivoting along a vertical plane. A pair of support members 22 prevent the frame structures 20 from pivoting past a horizontal plane as best illustrated in FIG. 2 of the drawings.

Figure 7:
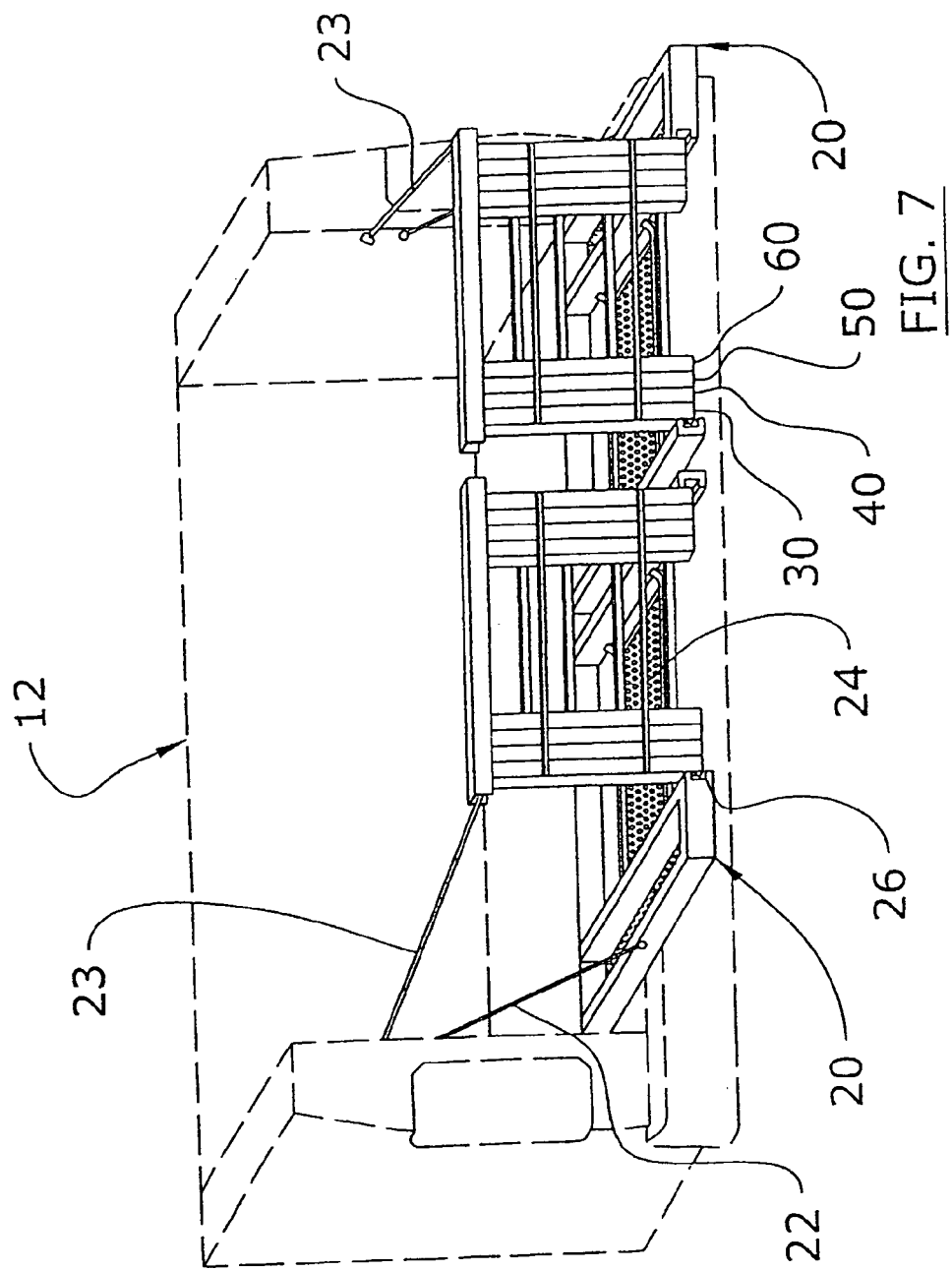
FIG. 7 is an upper perspective view of the tailgate ramp system with the ramp sections pivoted upwardly in a vertical manner for extending the length of the pickup box.

FIG. 7 illustrates an alternative use of the present invention comprising a pair of upper members 23 that attach between the pickup box 12 and the upper end of the frame structures 20 when positioned vertically. This alternative use allows for the pickup box 12 to be effectively lengthened.

A tailgate ramp system 80 according to a now preferred embodiment of the present invention will now be described with specific reference to FIGS. 11 through 17e of the accompanying drawings. The tailgate ramp system 80 includes a construction substantially similar to the construction of the tailgate ramp system 10 first described except as specifically noted below. In this embodiment of the tailgate ramp system 80, a main frame 82 includes a pair of opposed vertical side members 84 with a base member 90 extending between lower ends 86 of the side members 84 (FIG. 13). The side members 84 and base member 90 form a generally U-shaped configuration. The side and base members are maintained in a fixed position within a pickup box. Again, it should be appreciated that the tailgate main frame 82 may be attached to and utilized with a trailer or other vehicle to which tailgates or ramps may be used.

The main frame 82 of the tailgate ramp system 80 includes a pair of pivot bars 92 mounted to respective side members 84. More particularly, each pivot bar 92 has a lower end 94 pivotally coupled to the lower end 86 of a respective side member. Each pivot bar 92 includes an upper end 96 releasably coupled to an upper end 88 of the respective side member 84 such as with a latch 98, pin, or the like. Each pivot bar 92, therefore, is pivotally movable between a vertical configuration (FIG. 1) and a horizontal configuration (FIG. 2). The significance of this adjustability will be further described later.

Figure 11:
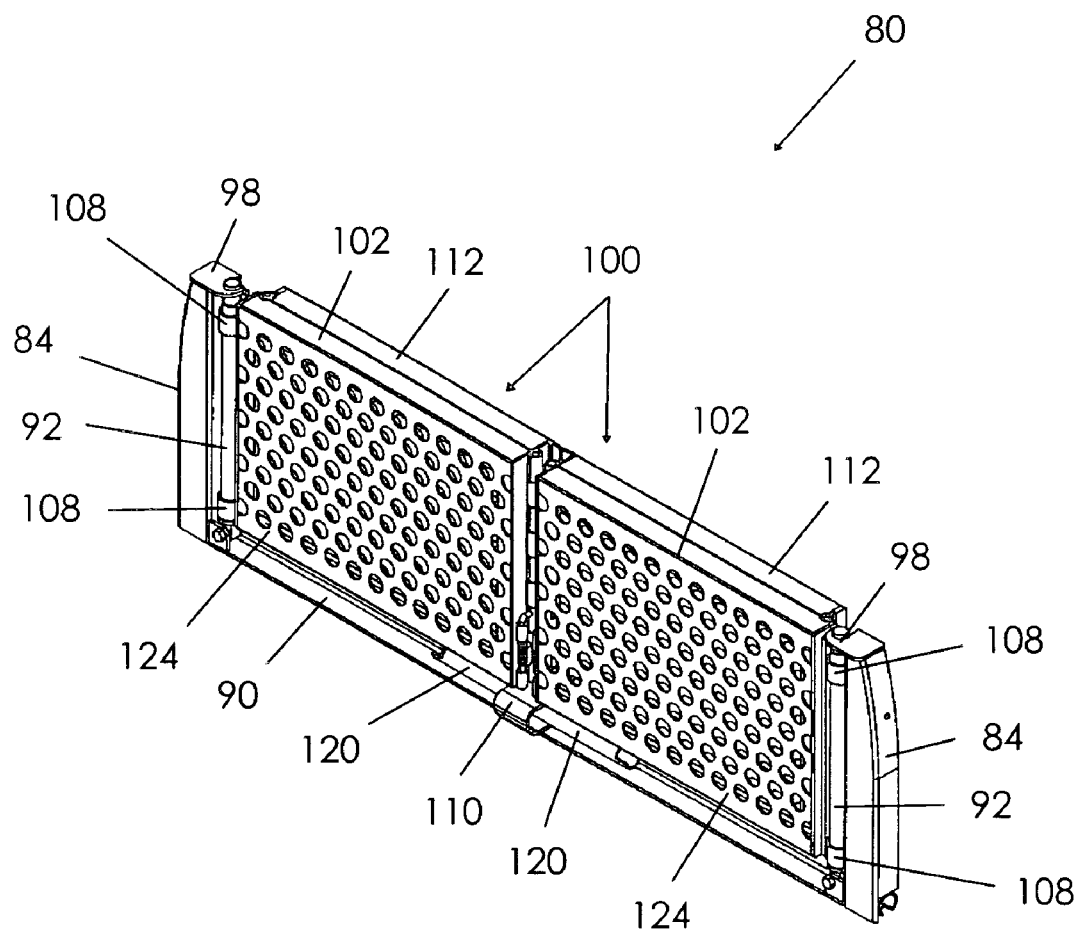
FIG. 11 is a perspective view of a tailgate ramp system in a closed configuration according to another embodiment of the present invention.

Further, the tailgate ramp system 80 includes a pair of ramp units 100. Each ramp unit 100 includes a plurality of ramp sections pivotally coupled to one another so as to be movable between folded and unfolded configurations. More particularly, each ramp unit 100 includes a first ramp section 102 having a first edge 104 rotatably coupled to a respective pivot bar 92 with a collar 108 or similar coupling. This attachment also enables the ramp unit 100 to be slidable along the respective pivot bar 92 as to be described in more detail later. In the vertical closed tailgate configuration as shown in FIG. 11, each ramp unit 100 functions as a tailgate section and is separately operable/rotatable within a horizontal plane between open (FIG. 14*b*) and closed (FIG. 14*a*) configurations. A latch structure 110 is mounted upon the base member 90 midway between the side members 84 (FIG. 13) and is configured to couple the ramp units 100 to the main frame 82 and selectively hold them at the closed tailgate configuration (FIG. 11). The ramp sections are covered with a grate member 124 although a solid plane construction, crossbars, or the like may also be used to form a platform for loading/unloading.

Figure 12:
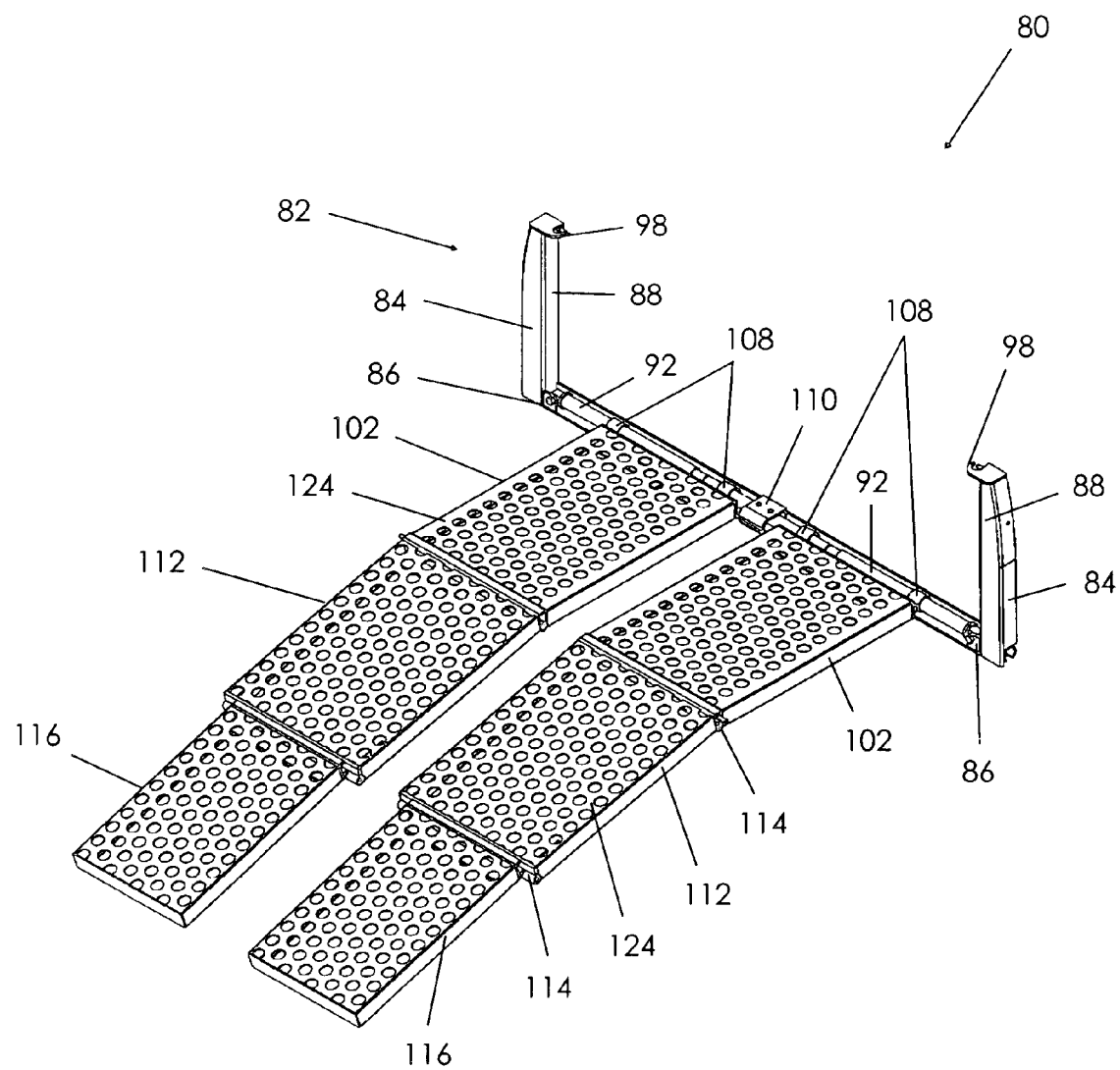
FIG. 12 is a perspective view of the tailgate ramp system as in FIG. 11 with the ramp sections in a ramp-use configuration with the ramp sections fully extended.
Figure 13:
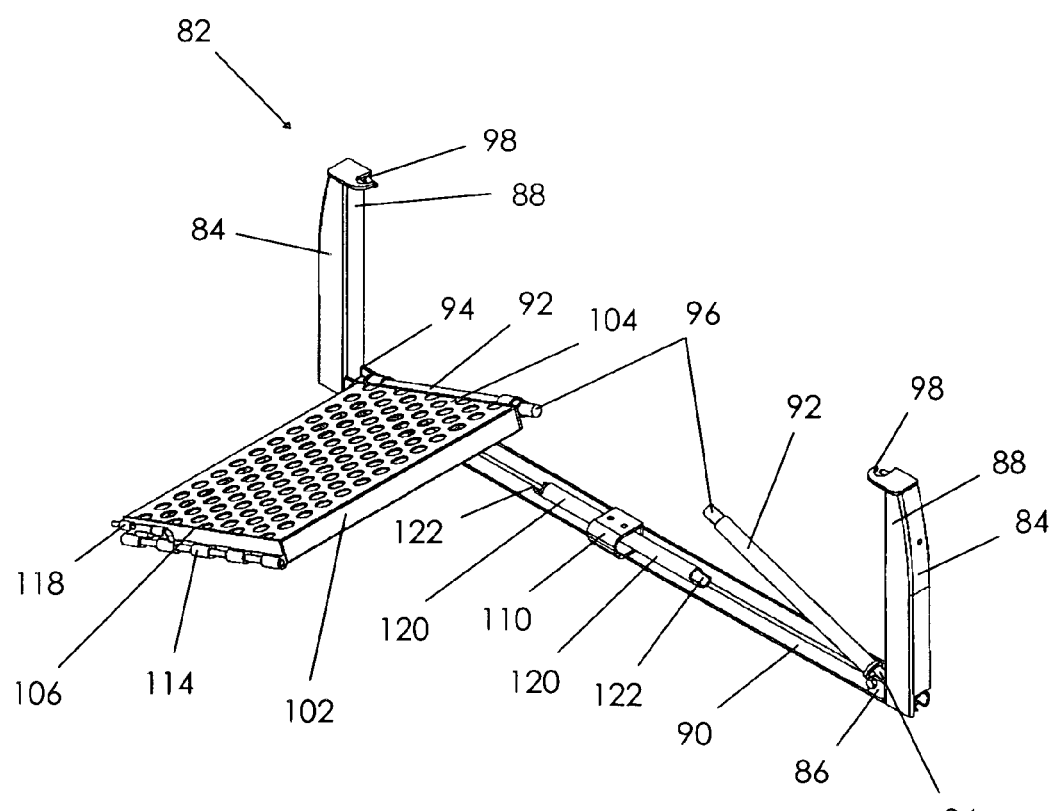
FIG. 13 is a perspective view of the tailgate ramp system as in FIG. 11 with one ramp unit removed and another ramp unit in transition between vertical and horizontal configurations.

Each first ramp section 102 includes a second edge 106 opposite a respective first edge 104 that is pivotally coupled to a first edge of a respective second ramp section 112 with a hinge 114 or other suitable pivotal fastener (FIG. 12). Therefore, each second ramp section 112 is pivotally movable relative to a first ramp section 102 between a folded and unfolded configuration (FIGS. 14*b* and 14*c*). Similarly, a third ramp section 116 is hingedly coupled to each second ramp section 112 (FIG. 14*d*). It is understood that each third ramp section 116 may include a smaller length and width so as to be held within corresponding second ramp sections 112 when positioned in the folded/storage configuration.

Figure 15:
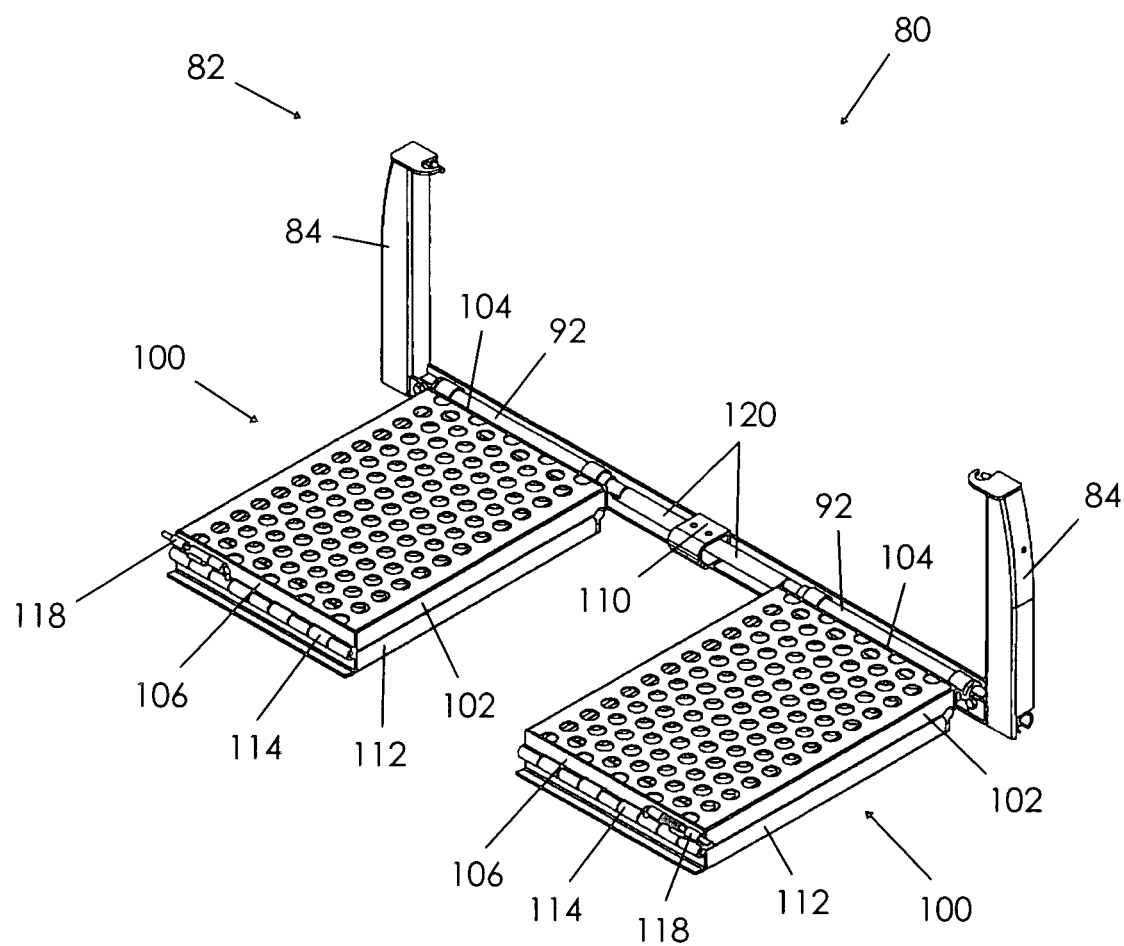
FIG. 15 is a perspective view of the tailgate ramp system with the ramp units in a horizontal but not fully extended configuration.
Figure 16A:
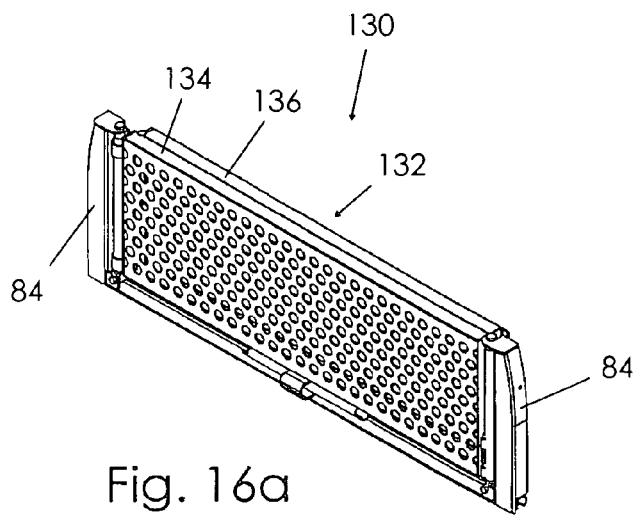
FIG. 16a is a perspective view of a tailgate ramp system in a closed configuration according to yet another embodiment of the present invention.
Figure 16B:
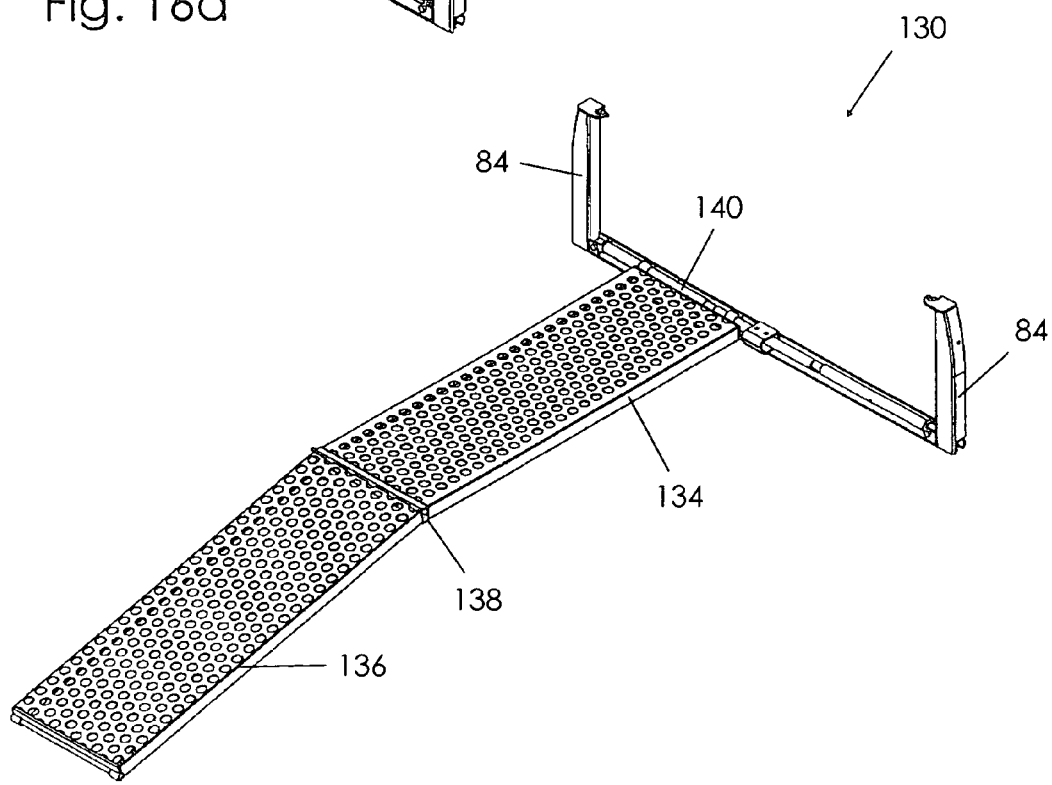
FIG. 16b is a perspective view of the tailgate ramp system as in FIG. 16a in a horizontal and fully extended configuration.
Figure 17A:
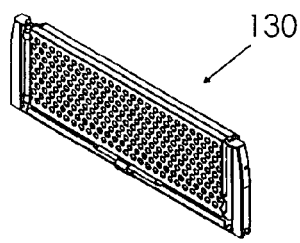
FIGS. 17a-17e are perspective views of the tailgate ramp system as in FIG. 16a with the ramp unit being transitioned between a vertical tailgate configuration to a horizontal and fully extended configuration.
Figure 17D:
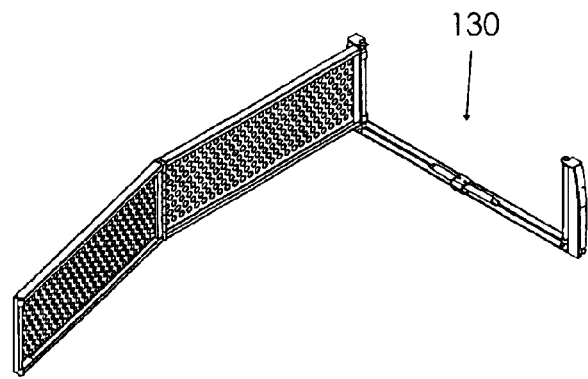
Figure 17B:
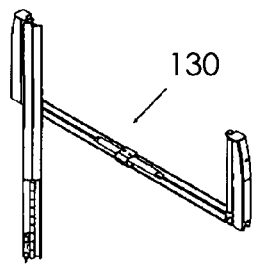
Figure 17E:
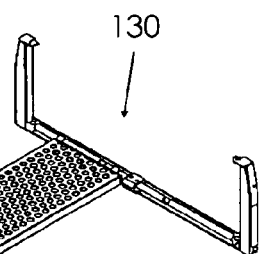
Figure 17C:
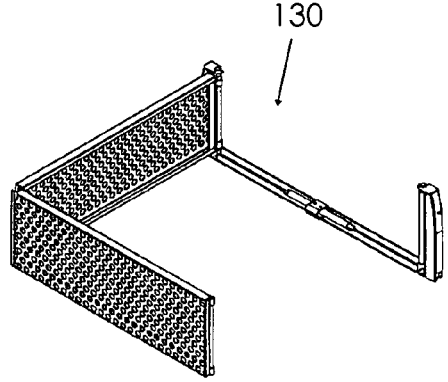

It should be appreciated that each ramp section hinge mechanism may also include a release pin mechanism 118 that enables a user to select which ramp sections to unfold. If the release pin mechanisms remain engaged when the ramp units are moved to the horizontal configuration, then the first ramp sections 102 act as pickup bed extenders (FIG. 15). This may be referred to as an extended bed configuration.

As best shown in FIG. 13, the tailgate ramp system 80 includes a pair of extension bar segments 120 mounted to the base member 90 of the main frame 82. It is understood, however, that the extension bar segments may be a single bar having opposed ends. The pair of extension bar segments 120 extend along the base member 90 beneath the latch structure 110. Each extension bar segment 120 includes a free end 122 having a configuration complementary to a configuration of the upper end 96 of a corresponding pivot bar 92 so as to receive the upper end thereof when the pivot bar 92 is pivoted to its horizontal configuration. As the pivot bars 92 and extension bar segments 120 have tubular configurations, the collars 108 that attach the ramp units 100 thereto are slidably movable therealong. Therefore, the ramp units 100 may be laterally aligned as desired by a user and may even be aligned such that the ramp units 100 may be immediately adjacent one another (FIGS. 14*f* and 14*g*).

Figure 18A:
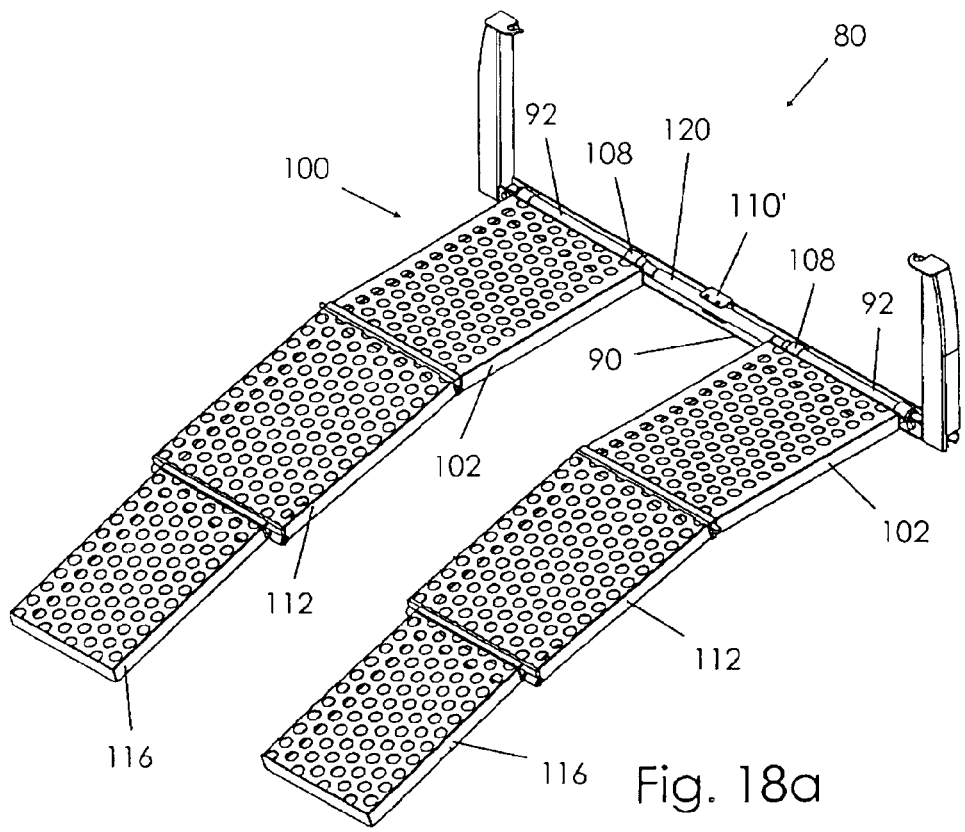
FIGS. 18a-18b are perspective views showing an alternative latch structure in use on the embodiment as in FIGS. 14f and 14g showing the ramp units placed into an immediately adjacent configuration.
Figure 18B:
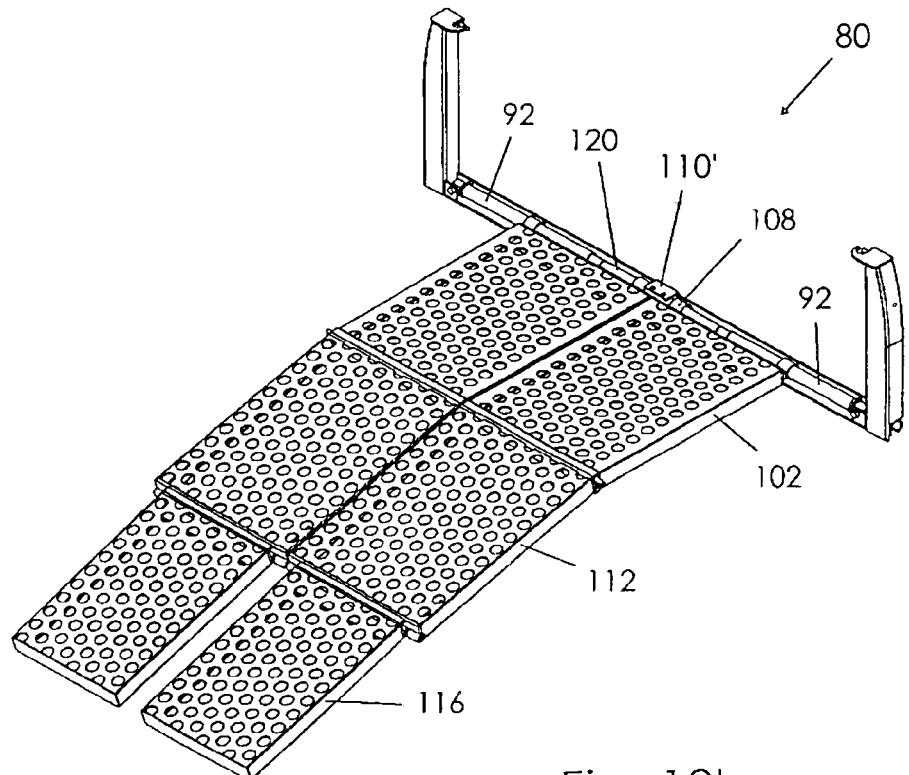

An alternative latch structure 110' may be utilized which presents an open front face (FIG. 18*a*) such that the collars 108 that attach the ramp units 100 may be slidably moved completely adjacent one another (FIG. 18*b*).

Figure 14A:
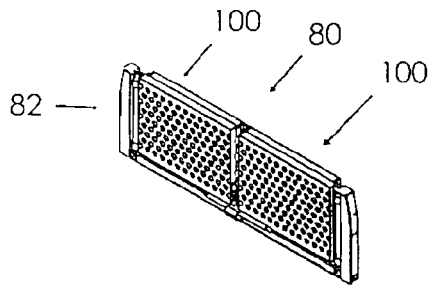
FIGS. 14a-14g are perspective views of the tailgate ramp as in FIG. 11 showing the ramp units being transitioned between a vertical closed tailgate configuration and a horizontal and fully extended ramp-use configuration.
Figure 14E:
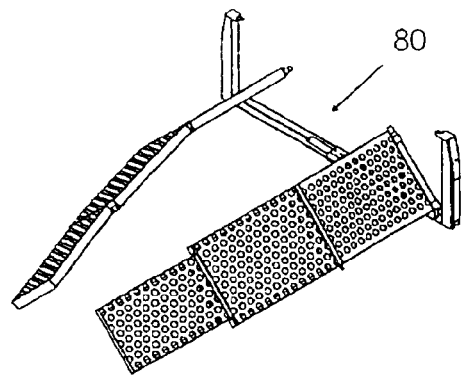
Figure 14B:
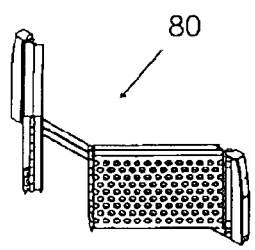
Figure 14F:
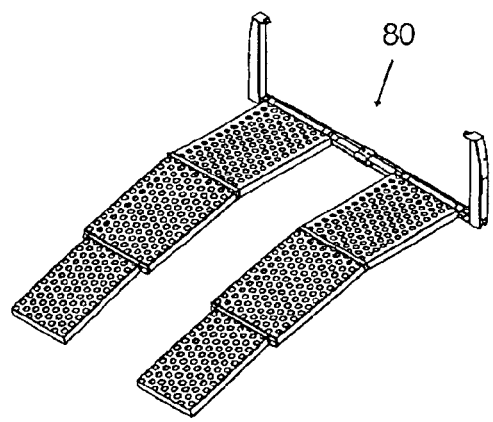
Figure 14C:
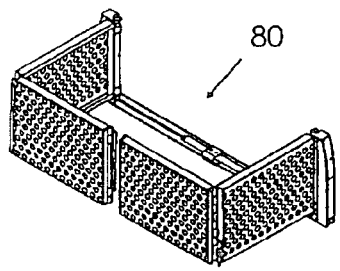
Figure 14D:
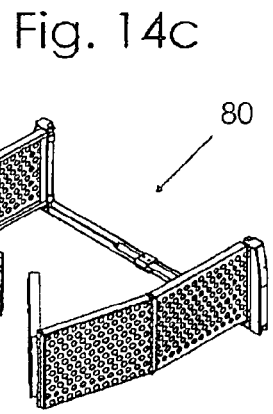
Figure 14G:
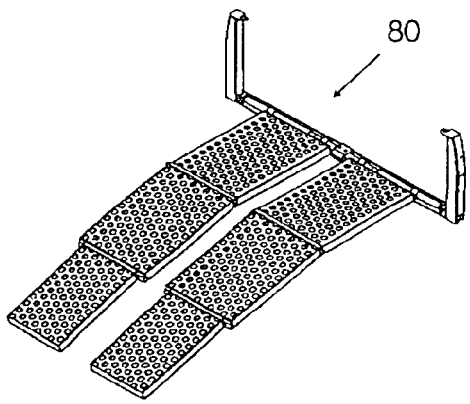

Use of the tailgate ramp system according to the now preferred embodiment is best shown in FIGS. 14*a* through 14*g*. The ramp units 100 may be swingably positioned in a closed configuration for use as a closed tailgate (FIG. 14*a*). Each ramp unit 100 is independently rotatable for gaining access to the interior of the pickup bed, such as to stow or retrieve cargo (FIG. 14*b*). The ramp units 100 include a plurality of ramp sections that may be pivotally unfolded (FIGS. 14*c* and 14*d*). Then, the unfolded ramp sections may be transformed into ramp structures by pivoting the respective pivot bars to their horizontal configurations (FIG. 14*e*). Finally, each of the plurality of ramp sections may be slidably laterally aligned to accommodate a vehicle for loading/unloading (FIGS. 14*f* and 14*g*). An opposite procedure is used to return the ramps to a tailgate configuration.

A tailgate ramp system 130 according to still another embodiment of the present invention is shown in FIGS. 16*a* through 17*g* and includes a construction substantially similar to the construction described immediately above except as specifically noted below. In this embodiment of the tailgate ramp system 130, a ramp unit 132 extends completely between the pair of main frame side members 84. A ramp unit first section 134 is pivotally coupled to a ramp unit second section 136 with a hinge 138 or the like. As described previously, the ramp unit 132 is rotatably coupled to a pivot bar 140 of one side member for swingable movement within a horizontal plane, i.e. swingable between open and closed configurations. Also as previously described, the pivot bar 140 to which the ramp unit 132 is attached is pivotal between a vertical tailgate-use configuration (FIG. 16*a*) and a horizontal ramp-use configuration (FIG. 16*b*). Use of the tailgate ramp system 130 according to this embodiment is best shown in FIGS. 17*a*-17*e*.

It is understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. A tailgate ramp system for use with a pickup having a pickup box, comprising:
    a main frame attachable within a pickup box;
    a pair of ramp units rotatably coupled to said main frame for separately-operable movement in a horizontal plane between open and closed tailgate configurations; and
    means in said main frame for pivoting said pair of ramp units between a vertical configuration and a horizontal configuration.

2. The tailgate ramp system as in claim 1 wherein said pair of ramp units includes a plurality of ramp sections that selectively extend outwardly.

3. The tailgate ramp system as in claim 2 wherein each of said plurality of ramp sections includes a first section slidably retained within a respective ramp unit.

4. The tailgate ramp system as in claim 2 wherein said plurality of ramp sections are slidably coupled to one another.

5. The tailgate ramp system as in claim 1 wherein:
    said means for pivoting said pair of ramp units includes a pair of pivot bars, each pivot bar having one end pivotally coupled to said main frame and an opposite end releasably coupled to an upper end of said main frame for movement between said vertical and horizontal configurations; and said pair of ramp units are rotatably coupled to respective pivot bars for selective movement thereabout within said horizontal plane.

6. The tailgate ramp system as in claim 1 wherein each said ramp unit includes a plurality of ramp sections that selectively extend outwardly, said plurality of ramp sections being hingedly coupled to one another.

7. The tailgate ramp system as in claim 1 further comprising a latch structure attached to said main frame and positioned intermediate said pair of ramp units for selectively holding said pair of ramp units at said closed tailgate configuration.

8. The tailgate ramp system as in claim 5 further comprising an extension bar attached to a base member of said main frame and having opposed ends, said opposed ends having configurations complementary to corresponding ends of said pivot bars for receiving said corresponding ends when said pair of pivot bars are moved to said horizontal configuration;

wherein said ramp units are slidably coupled to said pair of pivot bars, whereby said pair of ramp units are laterally slidable along said pivot bars and said extension bar when said pivot bars are at said horizontal configuration.

9. The tailgate ramp system as in claim 5 further comprising a grate member attached to said pair of ramp units.

10. A tailgate ramp system for use with a pickup having a pickup box, comprising:

a main frame attachable within a pickup box, said main frame having oppositely disposed vertical side members with an elongate base member extending between lower ends of said side members;

a pair of pivot bars mounted to said side members of said main frame, each pivot bar having one end pivotally coupled to a respective lower end of a respective main frame side member and an opposite end releasably coupled to a respective upper end of said respective main frame side member for movement between vertical and horizontal configurations;

a pair of ramp units rotatably coupled to said pair of pivot bars for separately-operable rotational movement in a horizontal plane between open and closed tailgate configurations when said respective pivot bars are in said vertical configuration; and wherein said pair of ramp units each includes a plurality of ramp sections hingedly coupled to one another for pivotally extending outwardly.

11. The tailgate ramp system as in claim 10 wherein each of said plurality of ramp sections includes:

a first section having a first edge coupled to a corresponding pivot bar and a second opposed edge; and a second section having a first edge hingedly coupled to said second opposed edge of said first section such that said second section is pivotally movable between folded and unfolded configurations.

12. The tailgate ramp system as in claim 11 wherein each of said plurality of ramp section includes means for selectively holding said second ramp section in said folded configuration.

13. The tailgate ramp system as in claim 10 further comprising a latch structure attached to said main frame and positioned intermediate said pair of ramp units for selectively holding said pair of ramp units at said closed tailgate configuration.

14. The tailgate ramp system as in claim 10 including a pair of extension bar segments mounted to said base member of said main frame, said pair of extension bar segments being configured to receive said pair of pivot bars at said horizontal configuration.

15. The tailgate ramp system as in claim 14 further comprising at least one collar attached to each ramp unit, said at least one collar being rotatably coupled to a respective pivot bar for rotatable movement thereabout, said at least one collar being slidably coupled to said respective pivot bar for slidable movement along said respective pivot bar and along a respective extension bar segment when said respective pivot bar is at said horizontal configuration.

16. A tailgate ramp system for use with a pickup having a pickup box, comprising:

a main frame attachable within a pickup box, said main frame having oppositely disposed vertical side members with an elongate base member extending between lower ends of said side members;

a pivot bar mounted to one of said side members, said pivot bar having one end pivotally coupled to a lower end of said one of said side members and having another end releasably coupled to an upper end of said one of said side members for movement between vertical and horizontal configurations;

a ramp unit rotatably coupled to said one of said side members for rotational movement in a horizontal plane between open and closed tailgate configurations when said pivot bar is in said vertical configuration;

said ramp unit having a plurality of ramp sections that selectively extend outwardly.

17. The tailgate ramp system as in claim 16 wherein said plurality of ramp sections are hingedly coupled to one another.

18. The tailgate ramp system as in claim 16 wherein said plurality of ramp sections includes:

a first section having a first edge coupled to said pivot bar and a second opposed edge; and a second section having a first edge hingedly coupled to said second opposed edge of said first section such that said second section is pivotally movable between folded and unfolded configurations.

19. The tailgate ramp system as in claim 18 wherein said first edge of said first section is rotatably coupled to said pivot bar with a collar such that said ramp unit is rotatable about said pivot bar and slidable therealong; and said tailgate ramp system including an extension bar mounted to said base member of said main frame, said extension bar being configured to receive said pivot bar at said horizontal configuration such that said ramp unit is slidable along said pivot bar and said extension bar for lateral positioning of said ramp unit.

* * * * *